US012779927B2

(12) United States Patent
Akai et al.

(10) Patent No.: US 12,779,927 B2
(45) Date of Patent: Nov. 3, 2026

(54) SUSPENSION SYSTEM

(71) Applicant: Hitachi Astemo, Ltd., Hitachinaka (JP)

(72) Inventors: Akihito Akai, Tokyo (JP); Ryusuke Hirao, Hitachinaka (JP); Makoto Matsuura, Hitachinaka (JP); Shota Kakita, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 19/108,862

(22) PCT Filed: Jul. 3, 2023

(86) PCT No.: PCT/JP2023/024663
§ 371 (c)(1),
(2) Date: Mar. 5, 2025

(87) PCT Pub. No.: WO2024/070111
PCT Pub. Date: Apr. 4, 2024

(65) Prior Publication Data

US 2026/0077626 A1 Mar. 19, 2026

(30) Foreign Application Priority Data

Sep. 26, 2022 (JP) ................................ 2022-152811

(51) Int. Cl.
*B60G 17/018* (2006.01)

(52) U.S. Cl.
CPC ........ *B60G 17/018* (2013.01); *B60G 2600/17* (2013.01)

(58) Field of Classification Search
CPC .............. B60G 17/018; B60G 2600/17; B60G 17/0165; B60G 17/0182;
(Continued)

(56) References Cited

U.S. PATENT DOCUMENTS

2005/0137786 A1* 6/2005 Breed ............ B60W 30/18159 701/482
2020/0026268 A1 1/2020 Matsubara et al.
(Continued)

FOREIGN PATENT DOCUMENTS

JP 2021-17168 A 2/2021
WO WO 2017/081984 A1 5/2017
(Continued)

OTHER PUBLICATIONS

Machine Translation of WO 2021187161 A1 PDF File Name: "WO2021187161A1_Machine_Translation.pdf" (Year: 2021).*
(Continued)

*Primary Examiner* — Grant Moubry
*Assistant Examiner* — Ruben Picon-Feliciano
(74) *Attorney, Agent, or Firm* — Crowell & Moring LLP

(57) ABSTRACT

A suspension system performs calculations using machine learning by making sensor information and suspension state information associate with each other. The suspension system includes: a weight parameter storage unit; a vehicle state estimation unit; a first vehicle behavior calculation unit that calculates a first physical value based on the estimation result; a second vehicle behavior calculation unit that calculates a second physical value based on the sensor information; an estimation accuracy verification unit that outputs estimation accuracy of the state of the suspension by comparing the first physical value and the second physical value to each other; and a traveling data control unit that instructs learning of weight parameters based on an output result of the estimation accuracy.

6 Claims, 14 Drawing Sheets

(58) Field of Classification Search
CPC .... B60G 2400/0521; B60G 2400/0522; B60G 2400/0523; B60G 2400/102; B60G 2400/104; B60G 2400/106; B60G 2400/202; B60G 2400/208; B60G 2400/822; B60G 2400/84; B60G 2401/142; B60G 2401/16; B60G 17/06; B60G 2500/10; B60G 2600/1878; B60G 2800/70; B60G 17/015; G01M 17/04; G06N 3/08; G06N 20/00; B60W 40/10
See application file for complete search history.

(56) References Cited

U.S. PATENT DOCUMENTS

| | | | |
|---|---|---|---|
| 2020/0184253 | A1 | 6/2020 | Butscher et al. |
| 2021/0023905 | A1 | 1/2021 | Fujimoto |
| 2022/0144282 | A1 | 5/2022 | Morimoto et al. |
| 2023/0294474 | A1 | 9/2023 | Matsuura et al. |
| 2024/0001936 | A1 | 1/2024 | Yamamoto |

FOREIGN PATENT DOCUMENTS

| | | | | |
|---|---|---|---|---|
| WO | WO 2020/194589 A1 | 10/2020 | | |
| WO | WO-2021187161 A1 * | 9/2021 | .......... | B60G 17/015 |
| WO | WO 2022/024919 A1 | 2/2022 | | |
| WO | WO 2022/168683 A1 | 8/2022 | | |

OTHER PUBLICATIONS

International Search Report (PCT/ISA/210) issued in PCT Application No. PCT/JP2023/024663 dated Aug. 22, 2023 with English translation (4 pages).
Japanese-language Written Opinion (PCT/ISA/237) issued in PCT Application No. PCT/JP2023/024663 dated Aug. 22, 2023 with English translation (5 pages).

* cited by examiner

SUSPENSION SYSTEM

TECHNICAL FIELD

The present invention relates to a suspension system.

BACKGROUND ART

There has been known a suspension control system that controls a posture of a vehicle by changing a damping force against a spring of a suspension corresponding to a road surface state or a driving state. The suspension control system controls the suspension by detecting sensor data obtained from sensors that detect a piston speed and a sprung vertical speed of a suspension of each of four wheels of a vehicle thus calculating control values. With respect to this sensor function, there exists a technique that realizes a sensorless system by mounting a neural network that realizes a logic and an estimation function that estimate sensor values from a controller area network (CAN) data from a viewpoint of the reduction of cost and the reduction of proper man-hours.

However, travelling roads are versatile and hence, it is not easy for the above-mentioned sensor value estimation technique to substitute the sensor function in all roads. Particularly, when the neural network is applied, there is a possibility that the continuous substitution of the sensors by a learned neural network mounted at the time of shipping becomes difficult. In view of the above, in the suspension control system, a continuous learning system for enhancing covering of the roads is necessary.

Further, in the field of image recognition that may adopt machine learning, a human easily identifies an image having a low recognition rate and hence, it is sufficient to perform additional learning by identifying the image. However, in the sensor value estimation technique that adopts the neural network on the premise of a sensorless system, sensor values that form teaching data do not exist whereby it is difficult to identify unfamiliar road states.

For example, in the following Patent Literature 1, a damper control system is disclosed that can perform a control of a characteristic of a damper with high response performance and robustness by receiving feedback data relating to the behavior of a vehicle and by performing a machine learning algorism.

CITATION LIST

Patent Literature

Patent Literature 1: Japanese Unexamined Patent Application Publication No. 2021-17168

SUMMARY OF INVENTION

Technical Problem

In view of the prior art, to realize the sensorless system that estimates a suspension state from other sensor information without directly detecting the suspension state by sensors, it is necessary to perform continuous learning that increases accuracy of a model of machine learning by extracting unfamiliar states of sensor value estimation. The present invention has been made in view of the above-mentioned circumstances and it is an object of the present invention to provide a sensorless suspension system that supports learning by extracting unfamiliar states of a neural network in a case where a sensor function is substituted by a neural network.

Solution to Problem

Provided is a suspension system that performs calculations using machine learning by making sensor information acquired from a plurality of sensors provided to a vehicle and suspension state information of a suspension provided to the vehicle associate with each other. The suspension system includes a weight parameter storage unit that stores a weight parameter calculated by the machine learning; a vehicle state estimation unit that outputs an estimation result of a state of the suspension based on the sensor information and the weight parameter; a first vehicle behavior calculation unit that calculates a first physical value of a physical quantity relating to behavior of the vehicle based on the estimation result that is outputted; a second vehicle behavior calculation unit that calculates a second physical value of the physical quantity based on the sensor information; an estimation accuracy verification unit that outputs estimation accuracy of the state of the suspension by the vehicle state estimation unit by comparing the first physical value and the second physical value with each other; and a traveling data control unit that instructs learning of the weight parameter to a learning control server based on an output result of the estimation accuracy by the estimation accuracy verification unit.

Advantageous Effects of Invention

It is possible to provide a sensorless suspension system where, a suspension state is estimated not by directly detecting a suspension state by a sensor but based on information from other sensors, and in estimating the suspension state, an unfamiliar state of a neural network is extracted for supporting learning.

Figure 1:
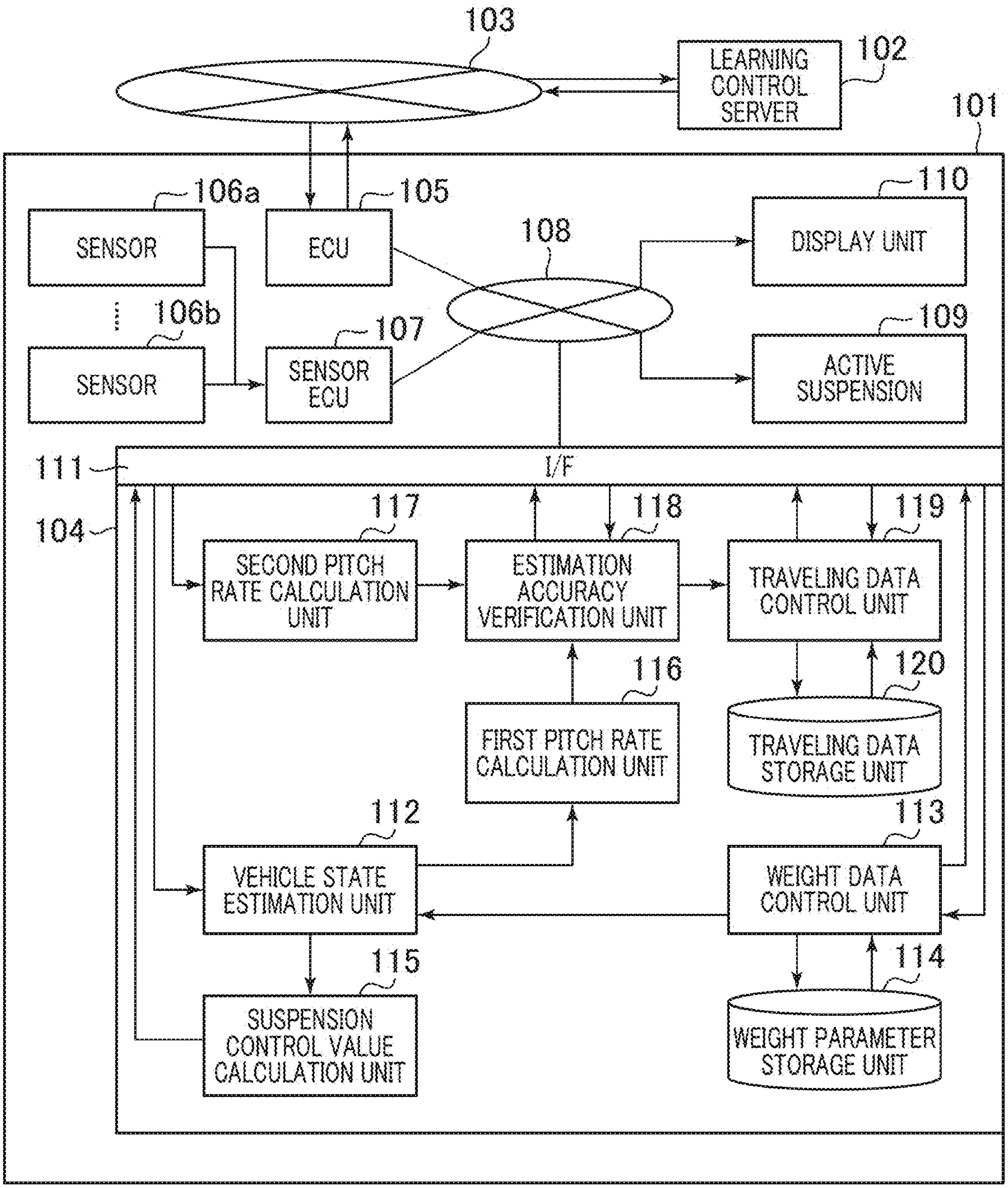
FIG. 1 is a functional block diagram of a suspension system according to a first embodiment of the present invention.

Hereinafter, embodiments of the present invention are described with reference to drawings. The following description and drawings are provided for exemplifying purpose for describing the present invention, and the description and the drawings are suitably omitted or simplified for the sake of clarifying the description. The present invention can be carried out in other various modes. Unless otherwise specified, the respect constitutional elements may be a single or a plural.

There may be a case where, in the drawings, the positions, the sizes, the shapes, ranges and the like of the respective constitutional elements illustrated in the drawing do not express actual positions, sizes, shapes, ranges and the like for facilitating the understanding of the invention. Accordingly, it is not always necessary that the present invention is limited to the positions, sizes, shapes, ranges and the like disclosed in the drawings.

Overall Configuration of Device According to the First Embodiment of the Present Invention (FIG. 1)

A suspension system that performs a control of a damping force for improving a riding comfort of a vehicle on the premise of sensorless system where suspension sensors are not mounted on the vehicle is constituted of a vehicle 101, a learning control server 102, an internet environment 103. The vehicle 101 is constituted of a suspension electronic control unit (ECU) 104, an ECU 105, sensors 106*a* to 106*b*, a sensor ECU 107, a CAN 108, an active suspension 109 (hereinafter, referred to as a suspension 109), a display unit 110, and an interface (I/F) 111.

The suspension ECU 104 includes a vehicle state estimation unit 112, a weight data control unit 113, a weight parameter storage unit 114, a suspension control value calculation unit 115, a first pitch rate calculation unit 116, a second pitch rate calculation unit 117, an estimation accuracy verification unit 118, a travelling data control unit 119, and a traveling data storage unit 120.

With respect to vibrations transmitted from a road surface by way of tires when the vehicle 101 travels, the suspension 109 suppresses the vibration that a driver or an occupant seated on a seat feels. An attenuation characteristic of the suspension 109 is controlled by the suspension ECU 104, and the suspension control value calculation unit 115 of the suspension ECU 104 induces a control value of the suspension 109.

The learning control server 102 is a server that controls learning of the vehicle state estimation unit 112 included in the suspension ECU 104, and transmits information to the vehicle 101 via the internet environment 103. The ECU 105 transmits information of the learning control server 102 transmitted from the internet environment 103 to the CAN 108. Accordingly, the information are shared with respective functional units via the CAN 108 in the suspension ECU 104. The sensor ECU 107 acquires information of the sensors 106*a* to 106*b*, and transmits the information to the CAN 108 thus sharing the sensor information with the respective functional units of the vehicle 101.

The respective functional units of the suspension ECU 104 are described. The suspension ECU 104 acquires information from the CAN 108 via the interface 111, or outputs information to the CAN 108 via the interface 111. The weight data control unit 113 determines a calculation specification for performing the estimation performed by the vehicle state estimation unit 112 by reading weight parameters stored in the weight parameter storage unit 114 (weight parameter memory unit). Further, the weight data control unit 113 acquires weight parameters learned from the learning control server 102 via the CAN 108, updates the weight parameters.

The vehicle state estimation unit 112 references sensor information that can be acquired by the sensors 106*a* to 106*b* as specific information among data constantly transmitted to the CAN 108. The sensors 106*a* to 106*b* detect, besides a rotational speed (a wheel speed) of one wheel out of four wheels that the vehicle 101 has, a longitudinal acceleration, lateral acceleration, vertical acceleration, a yaw rate, a roll rate, a pitch rate and the like respectively in a vehicle behavior system, and transmits these information to the CAN 108 as sensor information. In FIG. 1, the illustration is made as if there are two kinds of sensors 106*a* to 106*b* exist. However, in an actual vehicle 101, the sensors are provided for measuring the above-mentioned physical values. Accordingly, it is needless to say that the vehicle 101 includes a large number of sensors 106*a* to 106*b*. Further, in a case where the vehicle 101 on which the vehicle state estimation unit 112 is mounted is a learning-use vehicle, an acceleration sensor for suspension is mounted on the vehicle 101, and data of the acceleration sensor is also transmitted to the CAN 108.

The vehicle state estimation unit 112 acquires sensor information from the respective sensors 106*a* to 106*b*. Further, the vehicle state estimation unit 112 acquires values of weight parameters that the weight data control unit 113 read from the weight parameter storage unit 114 as data relating to a vehicle state during traveling. The vehicle state estimation unit 112 outputs estimation result of physical quantities relating to suspension controls for respective four wheels based on the acquired sensor information and the acquired weight parameters.

The suspension control value calculation unit 115 calculates control values for controlling damping forces of the suspensions 109 based on physical quantities estimated by the vehicle state estimation unit 112. By performing the calculation of the control values using the estimation in this manner, mounting of acceleration sensors for measuring a sprung vertical speed and a stroke speed of a piston that is required in the prior art becomes unnecessary thus contributing to the reduction of cost.

Subsequently, the verification of the estimation accuracy of the vehicle state estimation unit 112 is described. First, the vehicle state estimation unit 112 transfers estimated sprung vertical speeds of suspensions of four wheels (state information of the suspensions 109) to the first pitch rate calculation unit 116. The first pitch rate calculation unit 116 calculates pitch rates (first physical values) based on the transferred sprung vertical speeds of four wheels. On the other hand, vehicle speed data of four wheels (sensor information) included in the CAN 108 acquired from the plurality of sensors 106*a* to 106*b* provided to the vehicle 101 are transferred to the second pitch rate calculation unit 117. The second pitch rate calculation unit 117 calculates pitch rates (second physical values) based on the transferred wheel speed data of four wheels.

The present invention is made by focusing on that the pitch rates can be calculated based on either one of the sprung vertical speeds or the wheel speeds of four wheels, and aims to verify the estimation accuracy of the first pitch rates derived from the result of the estimation using the second pitch rate as a reference. Two pitch rates that are induced by performing the calculation based on the sprung vertical speeds and the wheel speeds of four wheels are compared with each other. When two pitch rates have substantially the same value, it is determined that the estimation accuracy of the sprung vertical speed that the vehicle state estimation unit 112 estimates is favorable.

The estimation accuracy verification unit 118 compares two pitch rates (the first physical value and the second physical value) calculated by the first pitch rate calculation unit 116 and the second pitch rate calculation unit 117 with each other. The estimation accuracy verification unit 118, in a case where the difference between two pitch rates is smaller than a predetermined threshold, determines that the estimation result that the vehicle state estimation unit 112 outputs has no problem. On the other hand, the estimation accuracy verification unit 118, in a case where the difference between two pitch rates is larger than the predetermined threshold, determines that the estimation result that the vehicle state estimation unit 112 outputs has a problem, and specifies that the output accuracy of the vehicle state estimation unit 112 is bad. In the case where the estimation accuracy verification unit 118 determines that the output accuracy of the vehicle state estimation unit 112 is bad, a flag that the estimation result that the vehicle state estimation unit 112 outputs has a problem is set to a time sequential data set inputted to the vehicle state estimation unit 112 via the CAN 108.

In this manner, with respect to the state of the suspensions 109 that is the estimation result outputted from the vehicle state estimation unit 112, the information on the difference between the first physical value and the second physical value is outputted as the estimation accuracy. The first physical value and the second physical value are not limited to a pitch rate, and may be other vehicle behavior data that can be calculated based on a plurality of information or data such as a roll rate.

In this manner, by comparing the pitch rate calculated based on the sprung vertical speed that the neural network estimates (the pitch rate that the first pitch rate calculation unit 116 calculates) and the pitch rate calculated based on the information on the wheel speed from the CAN 108 not via the neural network (the pitch rate that the second pitch rate calculation unit 117 calculates) with each other, it is determined whether the estimation accuracy of the sprung vertical speed acquired by the vehicle state estimation unit 112 is low accuracy.

The weight parameters used in the neural network of the vehicle state estimation unit 112 are parameters that are acquired by learning where teaching data is prepared based on a verification vehicle or the like on which the acceleration sensors for suspensions are mounted different from the vehicle 101.

The estimation accuracy verification unit 118 transfers a data set to which the flag indicating the existence of a problem is given to the traveling data control unit 119. The traveling data control unit 119 stores the transferred data set in the traveling data storage unit 120. By taking such processing, in the traveling data storage unit 120, the data sets in which the vehicle state estimation unit 112 is unfamiliar are stored. The traveling data control unit 119 instructs updating of the weight parameters to the learning control server 102 with respect to the traveling environment of the vehicle 101 based on the stored unfamiliar data sets. The learning control server 102 performs, in accordance with an instruction of the traveling data control unit 119 performed based on an output of the estimation accuracy verification unit 118, learning for updating the weight parameters. In this manner, the learning control server 102 learns the weight parameters based on an output result of the estimation accuracy verification unit 118 in the suspension ECU 104 mounted on the vehicle 101.

(FIG. 2A)

A neural network of the vehicle state estimation unit 112 is constituted of a hierarchical neural network having a three-layered configuration formed by coupling an input layer (the number of elements: i) 201, a hidden layer (the number of elements: j) 202 and an output layer (the number of elements: K) 203. An input layer element group 201 of the neural network includes: an input element group 201*a* of wheel speed time series; and an input element group 201*b* of vehicle behavior time series. A state of the suspension 109 is estimated based on these two element groups.

Figure 2A:
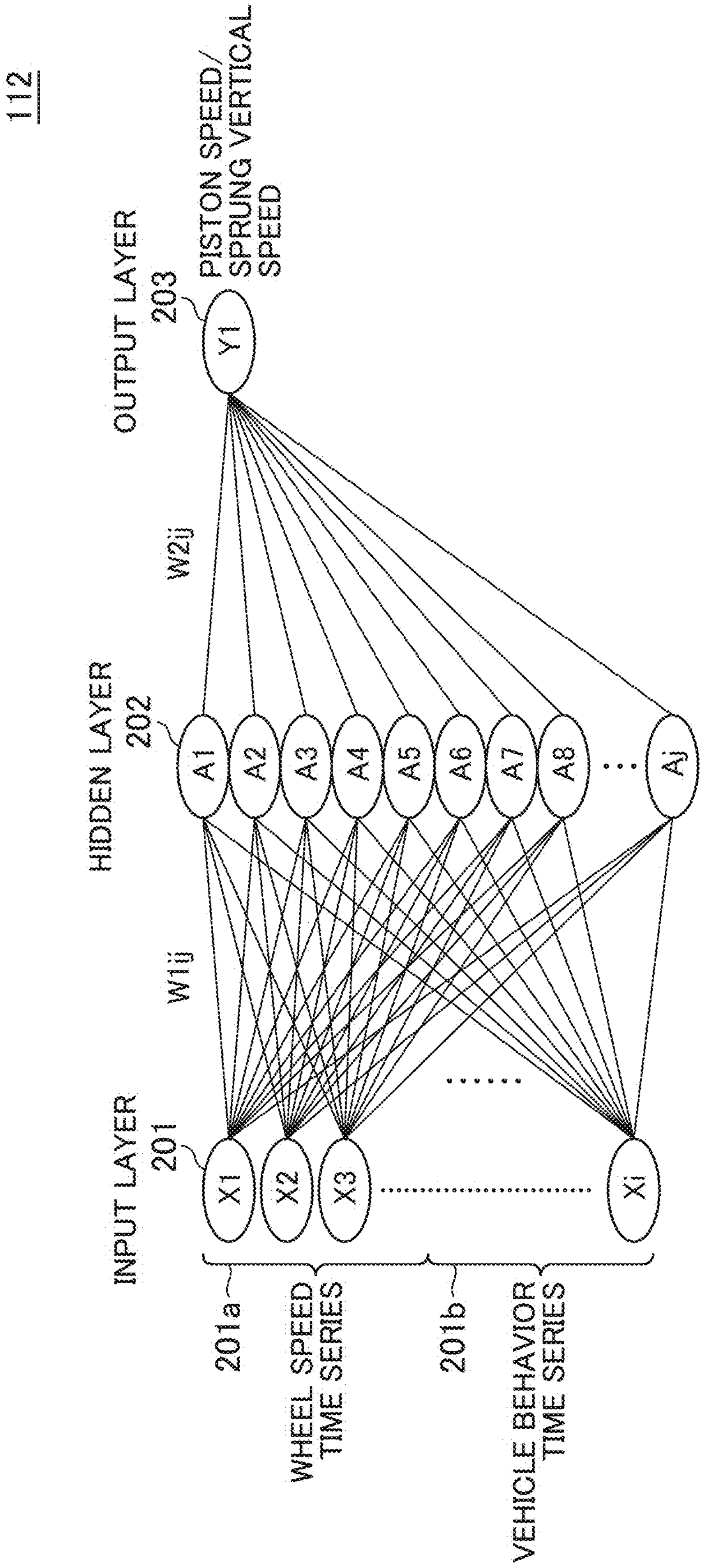
FIG. 2A is a diagram illustrating a vehicle state estimation unit illustrated in FIG. 1 in the form of the configuration of a neural network.
Figure 2B:
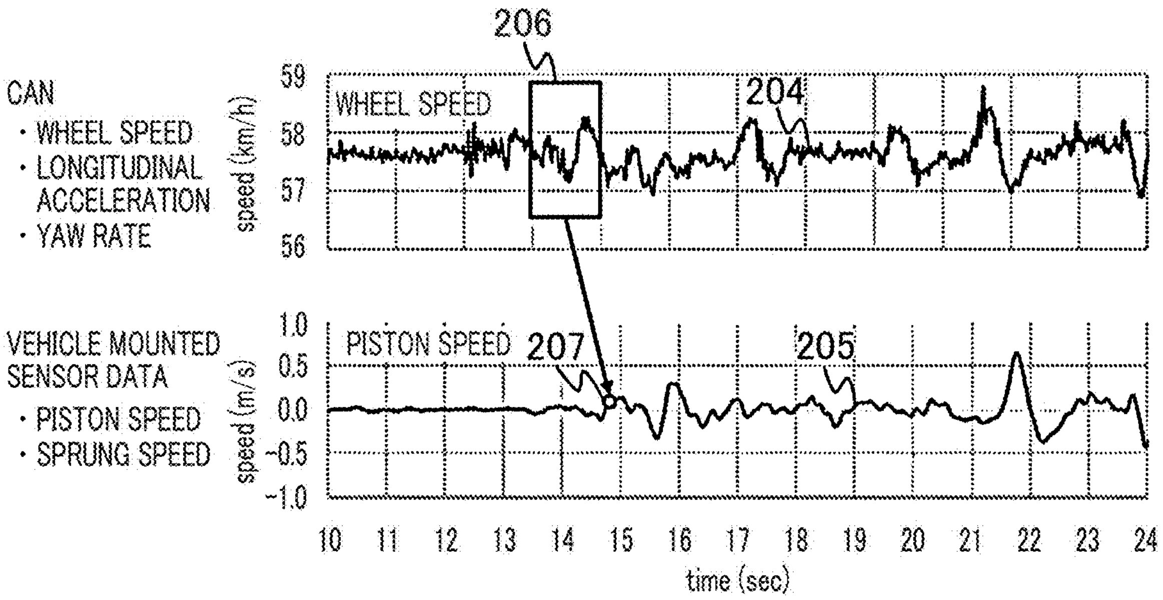
FIG. 2B is a relationship diagram illustrating an input/output data set used in learning the neural network.

The number of elements of the hidden layer element group 202 is, in general, decided based on the number of elements in the input layer element group 201 and the number of elements in the output layer element group 203. In this embodiment, assume the number that maximizes the accuracy of the state estimation by the neural network as the number of elements of the hidden layer element group 202. From the output layer element group 203, an estimated instantaneous value of a piston speed or a sprung vertical speed of the suspension 109 mounted on the vehicle is outputted. In FIG. 2A, a multilayer perceptron is illustrated as an example of the neural network. However, the neural network may be a recurrent neural network that is advantageous for learning of time series data.

The respective elements of the input layer element group 201 and the respective elements of the hidden layer element group 202 are coupled to each other with weights $W1ij$ (i=1 to I, j=1 to J) and the respective elements of the hidden layer element group 202 and the output layer elements 203 are coupled to each other with weights $W2jk$ (j=1 to J, k=1). These weight information (weight parameters) are expressed by matrixes of weights $W1ij$ and $W2jk$. The weight parameters are obtained by machine learning in advance, and are stored in a weight parameters storage unit 114. The vehicle state estimation unit 112 acquires the weight parameters from the weight parameter storage unit 114 via the weight parameter control unit 113 thus performing calculation using the neural network. In this case, the simplest all element connected type neural network is illustrated where the hidden layer element group 202 is formed of one layer. However, the neural network is not limited to such a neural network.

(FIG. 2B)

The drawing on an upper stage illustrates one example of a wheel speed out of information of the CAN 108. The learning by the neural network is, as described previously, performed by traveling the verification vehicle on which an acceleration sensor that measures a piston speed and a sprung vertical speed for controlling the suspension 109 and, at the same time, is performed using time series data 204 of data contained in the CAN of the verification vehicle, and sensor data (time series data of the vehicle mounted sensors) 205.

To be more specific, out of the time series data 204, a discrete value obtained by sampling data contained in a window 206 is set in the input layer element group 201 (FIG. 2A) of the neural network. Then, a sensor data instantaneous value 207 that corresponds to the discrete value is set in the output layer element 203 (FIG. 2A) of the neural network. With respect to the relationship between the window 206 and the sensor data instantaneous value 207, assuming a width of the window 206 as 1 second for example, the sensor data instantaneous value 207 has a specification that the sensor data instantaneous value 207 is estimated from a traveling history before 1 second. Accordingly, assuming a sampling interval to 20 m/sec for example, the number of sampling points in the window 206 becomes 50 (=1 second+20 m/sec), and the combination of a group of 50 data and the sensor data instantaneous value 207 is defined as a learning data set. Then, by sliding the window 206 and the sensor data instantaneous value 207 for every 20 m/sec in the time direction, the data set is increased by n times. Accordingly, learning of the neural network that uses the large number of data sets can be performed.

(FIG. 3A)

The estimation of a vehicle state and the notification of necessity of learning in the vehicle 101 are described. First, in step S101, the vehicle state estimation unit 112 determines whether or not the vehicle 101 is traveling. When the vehicle 101 is traveling, the processing proceeds to step S102 and the step S103, and the flow ends when the vehicle 101 is not traveling.

In step S102, the second pitch rate calculation unit 117 calculates a pitch rate from a wheel speed. On the other hand, in step S103, the vehicle state estimation unit 112 estimates a sprung vertical speed. In step S104, based on the sprung vertical speed estimated in step S103, the first pitch rate calculation unit 116 calculates a pitch rate, and the processing proceeds to step S105.

In step S105, based on two pitch rates calculated in step S102 and step S104, the estimation accuracy verification unit 118 calculates estimation accuracy (error). In step S106, when the estimation accuracy (error) is larger than 1 degree as an example of a predetermined threshold, the processing proceeds to step S106. When the estimation accuracy (error) is smaller than 1 degree, the processing returns to step S101. Although the error of 1 degree is used as the threshold of the determination reference of estimation accuracy using the pitch rate, the threshold is not limited to such a value.

In step S107, a learning necessary flag is given to data where the estimation accuracy (error) is larger than 1 degree so that the estimation accuracy verification unit 118 determines that the estimation accuracy is bad. In step S108, with respect to the traveling data to which the learning necessary flag is given, the traveling data control unit 119 performs writing to the traveling data storage unit 120. In step S109, the traveling data control unit 119 counts the number of learning necessary flags.

In step S110, the traveling data control unit 119 determines whether or not the number of learning necessary flags stored in the traveling data storage unit 120 becomes larger than 1000 counts. This 1000 counts becomes a condition for transferring data accumulated in the traveling data storage unit 120 to the learning control server 102. When the number of learning necessary flags becomes larger than 1000 counts, the processing proceeds to step S111, and traveling data control unit 119 transfers traveling data to which learning necessary flags are given to the learning control server 102 that is the traveling data server. As the condition for transferring data to the learning control server 102, the reference for the number of the learning necessary flags is set to 1000. However, the reference is not limited to such a value.

Figure 3A:
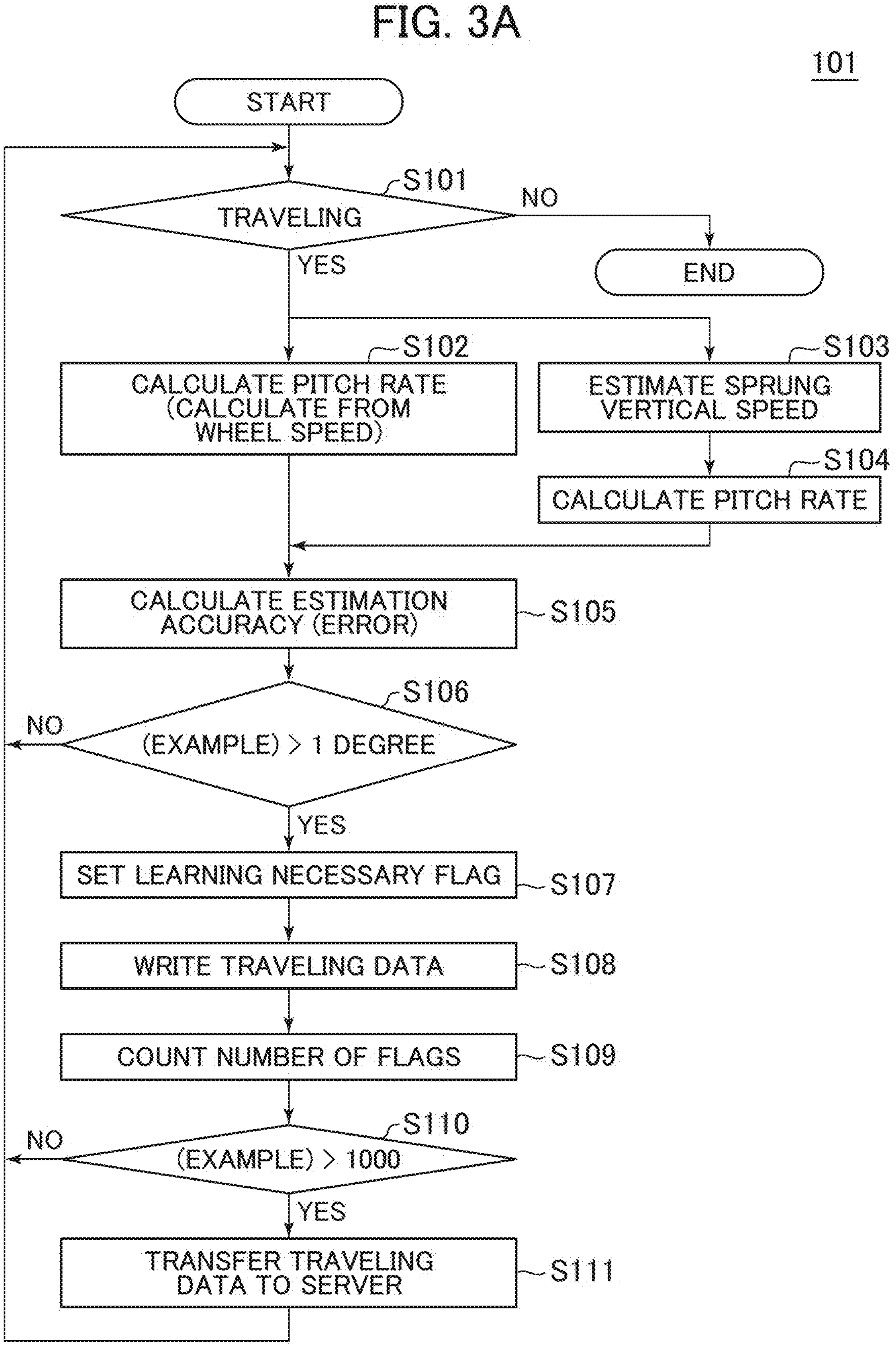
FIG. 3A is a flowchart relating to the estimation of a vehicle state and the notification of necessity of learning on a vehicle side.
Figure 3B:
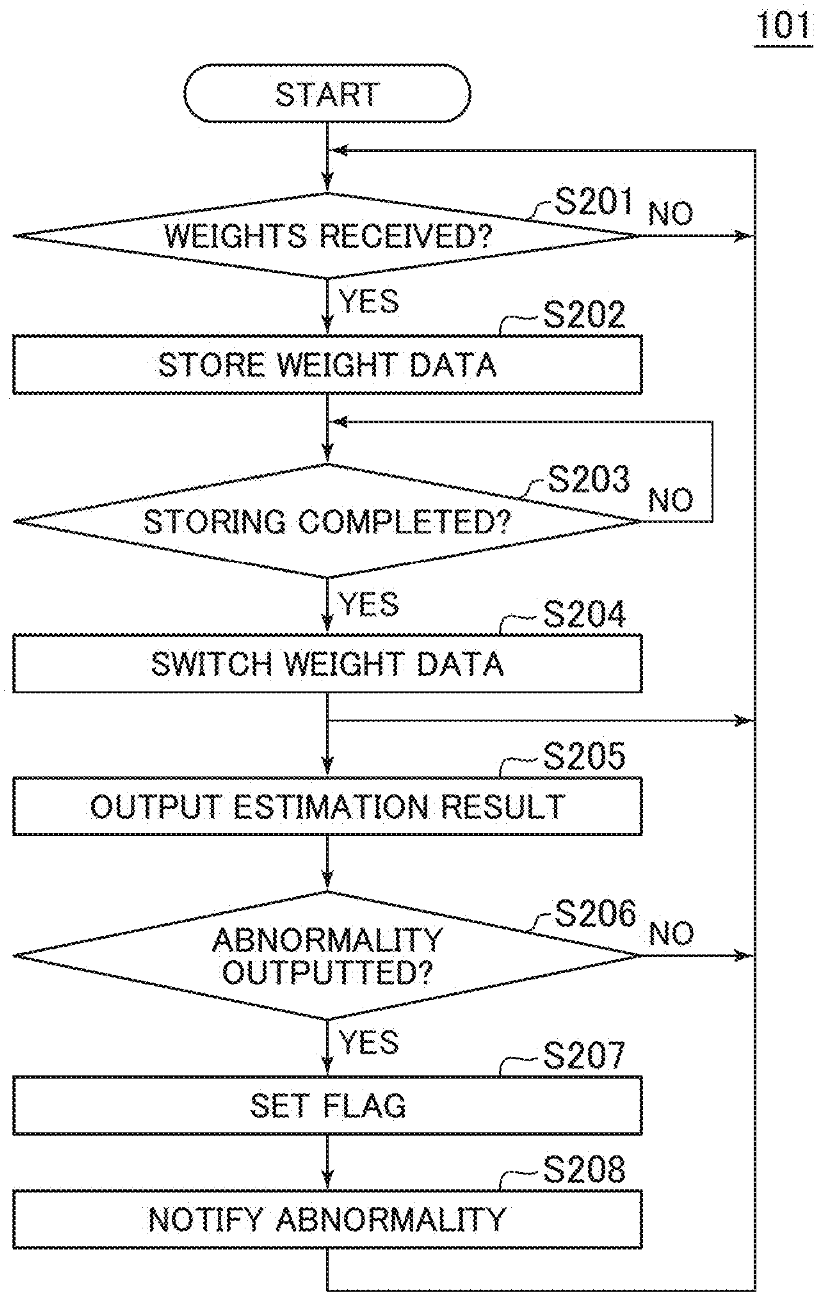
FIG. 3B is a flowchart relating to weight data updating on the vehicle side.
Figure 3C:
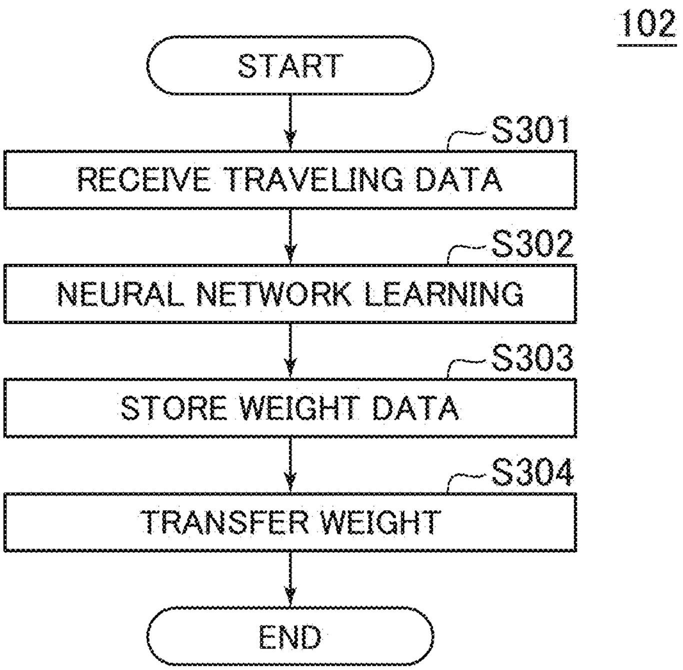
FIG. 3C is a flowchart relating to weight data learning on a server side.

(FIG. 3B) Updating of data of weight parameters in the vehicle 101 is described. In step S201, the weight data control unit 113 determines whether or not there is the reception of weight parameters from the learning control server 102. When there is the reception of the weight parameters, the processing proceeds to step S202. When there is no reception of the weight parameters, step S201 is repeated.

In step S202, the weight data control unit 113 stores data of acquired weight parameters in the weight parameter storage unit 114. In step S203, the weight data control unit 113 determines whether or not storing of the weight parameters in the storage unit 114 is completed. When the storing of the weight parameters has been completed, the processing proceeds to step S204. When the storing of the weight parameters is not completed, step S203 is repeated.

In step S204, the weight data control unit 113 performs switching of the weight parameters and, again, repeats the flow from the step S201, and proceeds to the flow of step S205. In step S205, the vehicle state estimation unit 112 estimates a vehicle state based on the weight parameters, and outputs an estimation result.

Figure 4A:
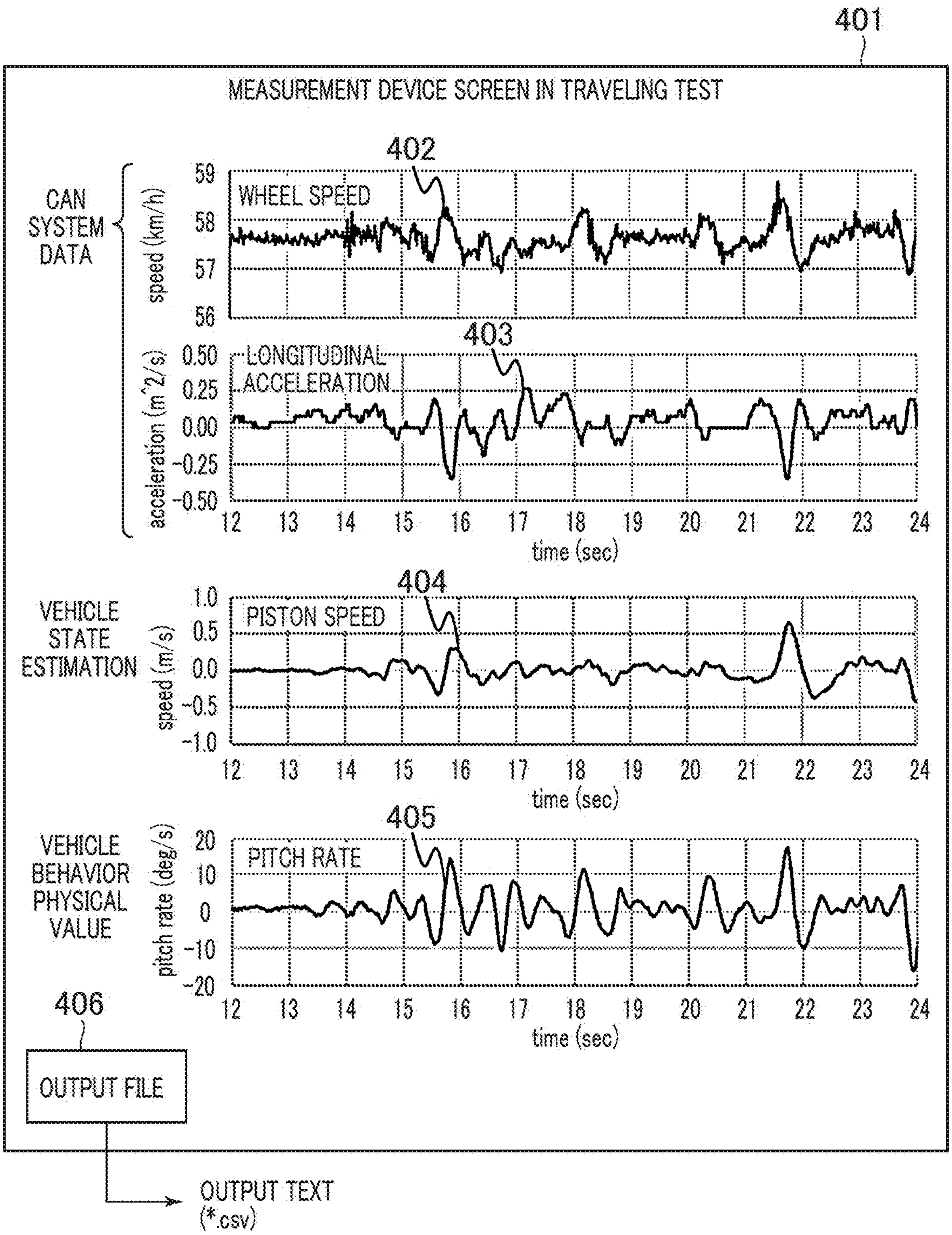
FIG. 4A is an example of a terminal screen for visualizing CAN data, and data relating to a vehicle behavior estimation result and vehicle behavior physical value calculation result data.
Figure 4B:
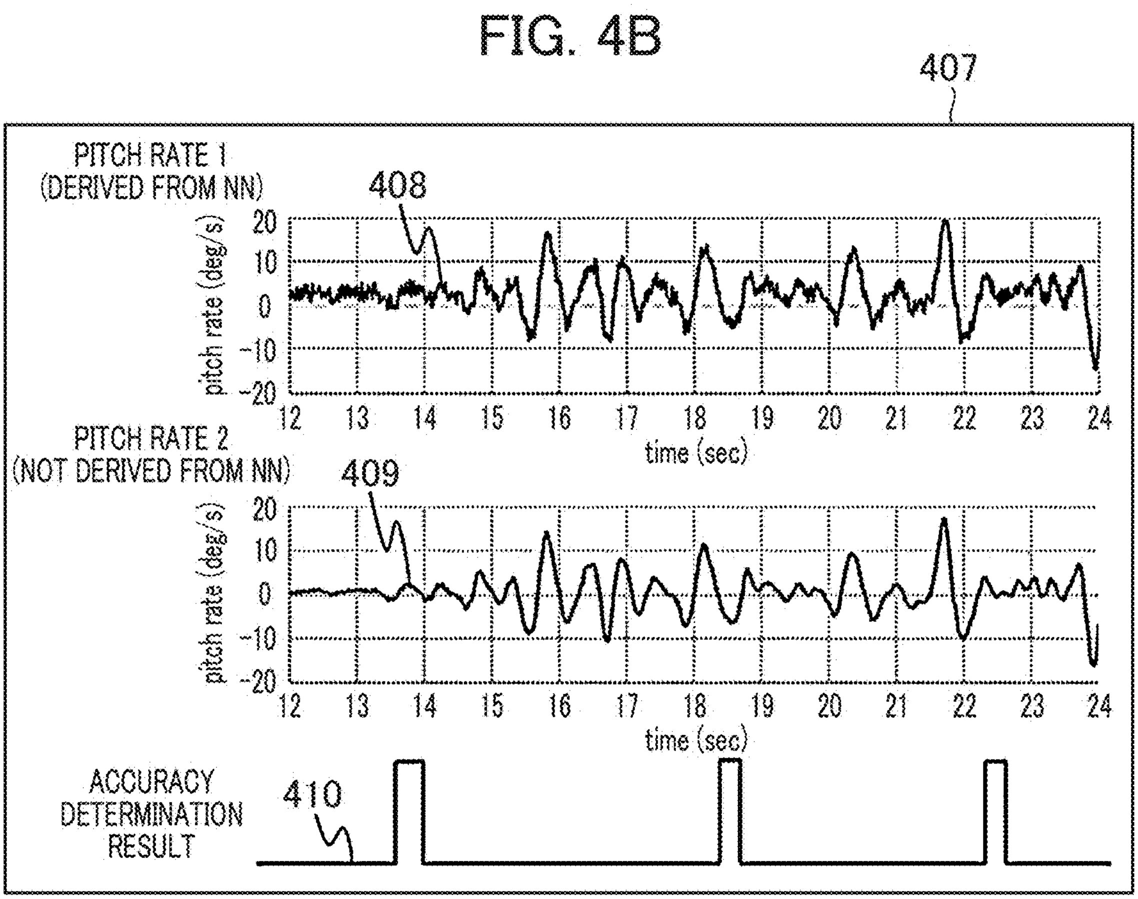
FIG. 4B is another example where a terminal screen for visualizing data of the vehicle is estimated.

In step S206, the estimation accuracy verification unit 118 determines whether or not abnormality exists in an estimation output of the vehicle state estimation unit 112. In a case where the abnormality exists in the estimation output, the processing proceeds to step S207, and in a case where the abnormality does not exist in the estimated output, the flow from the step S201 is repeated. In step S207, the estimation accuracy verification unit 118 gives a learning necessary flag to the traveling data that has abnormality. In step S208, the estimation accuracy verification unit 118 notifies the abnormality of the estimation output to a developer of the vehicle state estimation unit 112 who possesses a terminal having a terminal screen 407 illustrated in FIG. 4B described later and inspectors and the like who perform maintenance, inspection and the like and, then, the flow from step S201 is repeated.

(FIG. 3C)

Learning of weight parameters in the learning control server 102 is described. In step S301, the learning control server 102 receives traveling data from the vehicle 101. Subsequently, in step S302, the learning control server 102 performs learning of the neural network. Next, in step S303, the learning control server 102 stores the weight parameters. Next, in step S304, the learning control server 102 transfers the weight parameters to the weight data control unit 113, and the flow ends.

(FIG. 3D)

Figure 3D:
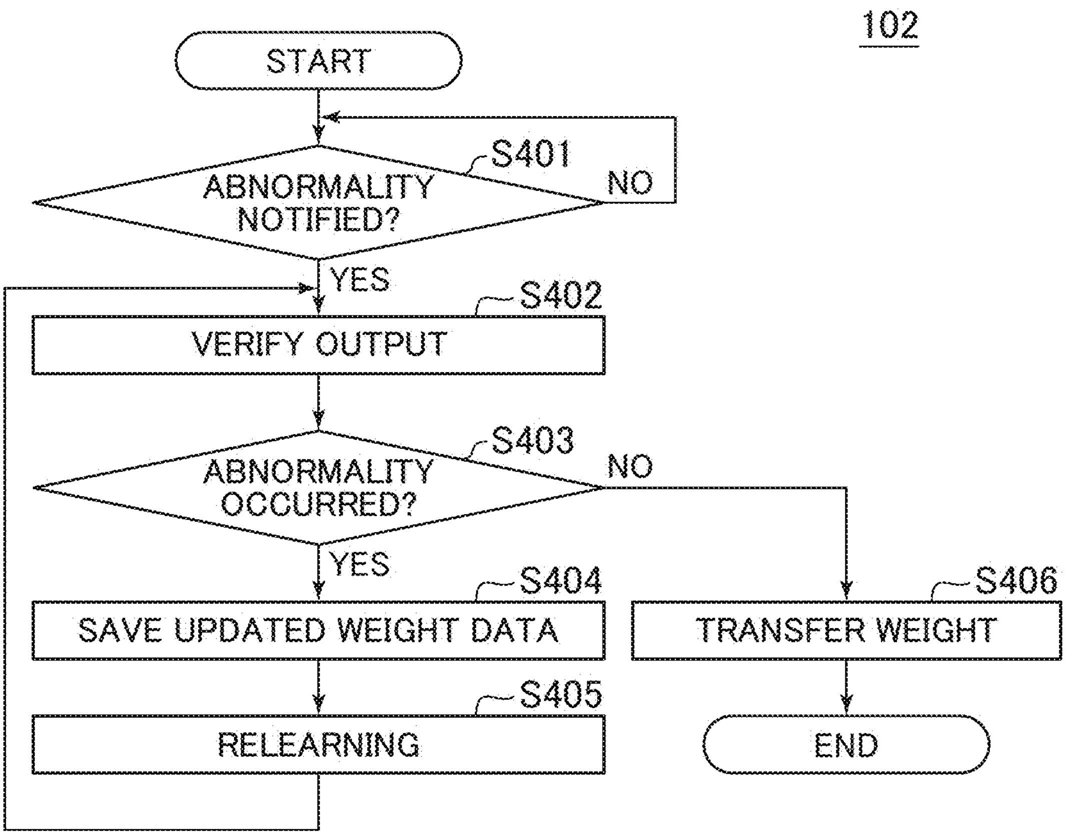
FIG. 3D is a flowchart relating to a measure to cope when abnormality is detected on a server side.

FIG. 3D describes the flow of a measure to take when abnormality is detected in the estimation of a vehicle state in the learning control server 102. In step S401, the learning control server 102 determines whether or not there exists the notification of abnormality with respect to the estimation of the vehicle state from the estimation accuracy verification unit 118. When there exists the notification of abnormality, the processing proceeds to step S402, and when there is no notification of abnormality, step S401 is repeated. In step S402, the learning control server 102 performs the verification of an output of the vehicle state estimation unit 112.

In step S403, the learning control server 102 determines whether or not abnormality has occurred in an output of the vehicle state estimation unit 112. When it is determined that the abnormality has occurred, the processing proceeds to step S404, and when it is determined that the abnormality has not occurred, the processing proceeds to step S406.

In step S404, data of updated weight parameters that the learning control server 102 stores are saved. Subsequently, in step S405, learning is performed again in the learning control server 102, and the flow in step S402 is repeated. In step S406, since it is determined that abnormality has not occurred in step S403, the weight parameters are transferred to the vehicle 101 from the learning control server 102. Relearning is described with the content where updated weight parameters are saved and learning is performed with new initial values. However, relearning may be additional learning where updated weight parameters are used as initial values.

(FIG. 4A)

On a measurement device screen 401 used in a traveling test for visualizing data relating to CAN system data, a vehicle behavior estimation result and calculation result data of a vehicle behavior physical value, on an upper stage, plural kinds of data 402, 403 (CAN system data) referenced from the CAN 108 are displayed. In an intermediate stage of the measurement device screen 401, a vehicle behavior estimation result 404 that the vehicle state estimation unit 112 outputs is displayed. In a lower stage of the measurement device screen 401, time series data 405 of vehicle behavior physical values are displayed. Further, for example, assume that a data set inputted to the neural network is a data set that includes a file output button 406 for outputting and storing the data set as text data as a file in a CSV format. The button 406 may be a physical button provided to the device, may be selected by a touching operation, or may be selected by a pointing device or the like. Further, the buttons may be selected by a touching operation by fingers in combination with a touch sensor function.

(FIG. 4B)

On the terminal screen 407, a pitch rate 408 that is calculated by the first pitch rate calculation unit 116 based on an output of the neural network that is an output of the vehicle state estimation unit 112, and a pitch rate 409 that is calculated by the second pitch rate calculation unit 117 not based on an output of the neural network that is wheel speed of four wheels are displayed in parallel. Further, assume that an accuracy determination result 410 that provides a display such that a high level is selected when a difference between two kinds of pitch rates is not less than predetermined value and a low level is selected in a case where the difference between two kinds of pitch rates is less than the predetermined value is displayed parallel to two pitch rates.

(FIG. 4C)

Figure 4C:
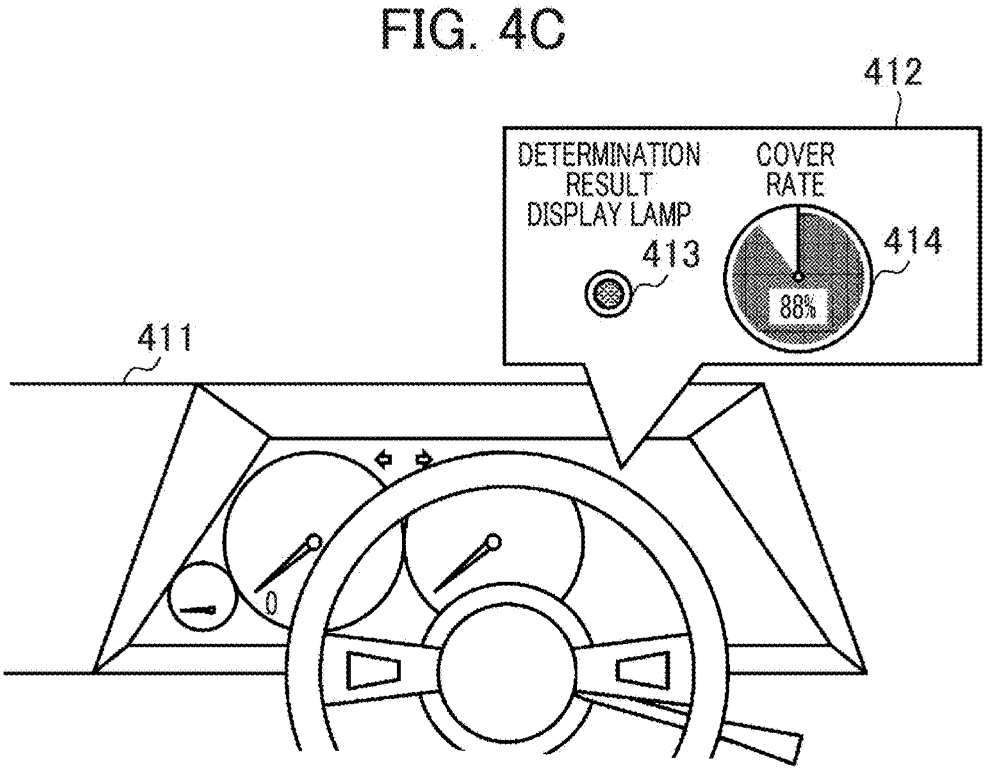
FIG. 4C is an example of a case that allows a driver to check a result of the vehicle behavior estimation.

FIG. 4C is a view illustrating a case where a user can check a result of the vehicle behavior estimation through the display unit 110. In this embodiment, the user is a driver as an example. The display contents of an instrument panel 411 are contained in the vehicle behavior estimation result 412. For example, a lamp 413 is a lamp that is turned on when the accuracy determination result 410 has a large error at a high level. Further, a display meter 414 displays a graph with respect to a traveling distance and a traveling time. That is, the display meter 414 displays a distance in a traveling stage when the accuracy determination result 410 (FIG. 4B) is at a high level or a rate of time during which the accuracy determination result 410 is at the high level.

Accordingly, the estimation accuracy that the estimation accuracy verification unit 118 outputs is provided to a user such as a developer of the vehicle state estimation unit 112, an inspector who has a terminal and performs a maintenance and the like, and a driver of the vehicle 101 and the like via the display unit 110. As a result, whether accuracy of the suspension system to which the neural network is applied is good or bad can be checked and hence, a low accuracy state can be recognized.

Figure 5:
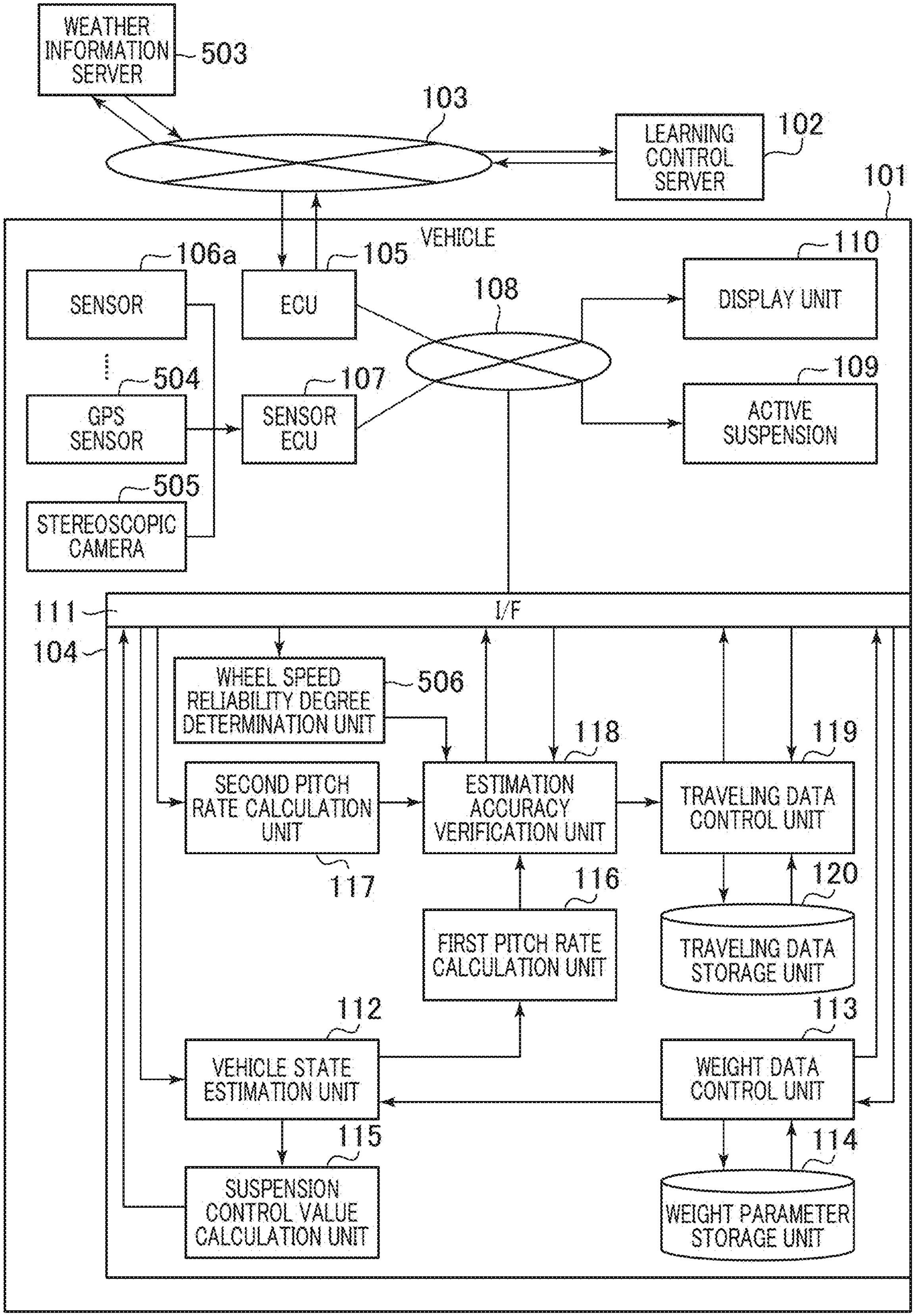
FIG. 5 is a functional block diagram of a suspension system according to a second embodiment of the present invention.
Figure 6:
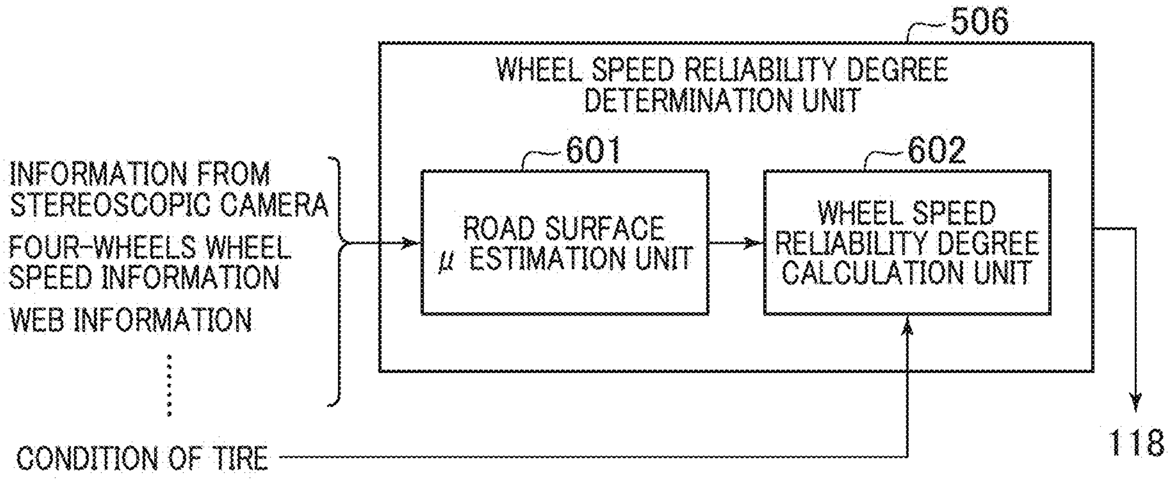
FIG. 6 is one example of the internal configuration of a wheel speed reliability determination unit illustrated in FIG. 5.

Second Embodiment (FIG. 5)

The second embodiment is an embodiment that focuses on that the reliability of the calculation of a pitch rate derived from a wheel speed differs depending on weather or a road surface state. As changes and additional functional units in the second embodiment with respect to the first embodiment, the suspension system includes a weather information server 503, a GPS sensor 504, a stereoscopic camera 505 (stereo camera), and a wheel speed reliability degree determination unit 506. The wheel speed reliability degree determination unit 506 determines the reliability of the output of the estimation accuracy verification unit 118 based on information outside the vehicle 101, for example, information from the weather information server 503, the stereoscopic camera 505 and the GPS sensor 504 mounted on the vehicle 101. In this manner, the second embodiment references a road surface state and focuses on a change in the reliability of a pitch rate corresponding to the road surface state, and aims at the extraction of an unfamiliar state of the neural network by reflecting the reliability degree determination result.

(FIG. 6)

The wheel speed reliability degree determination unit 506 includes a road surface μ estimation unit 601, and a wheel speed reliability calculation unit 602. The information that the wheel speed reliability degree determination unit 506 references are information from the stereoscopic camera 505, information from the GPS sensor 504, information from the weather information server 503, information on the state of tires mounted on the vehicle 101 and the like. The wheel speed reliability degree determination unit 506 references these information, and inputs these information to the road surface μ estimation unit 601.

Assume that the road surface μ estimation unit 601 is a unit that has a function of detecting, based on information from the stereoscopic camera 505 for example, a state that a road surface on which the vehicle 101 generally travels is slippery, for example, a situation where a water pool is formed on a road surface due to a rainfall, or a situation where a road surface μ is low due to snowfall or freezing. With respect to the road surface μ estimation unit 601, it is sufficient that substantially the same detection can be made even when the stereoscopic camera 505 is not used. Accordingly, a road surface situation may be estimated by making an inquiry to the weather information server 503 using position information of an own vehicle that can be acquired from the GPS sensor 504.

Alternatively, whether or not a road surface is slippery or wheels are liable to easily idle may be detected based on information from the GPS sensor 504 by controlling information on elements that are constantly decided other than elements that change corresponding to the situation of the surrounding described heretofore such as a sandy ground and a dirt road surface formed of dirt having a coarse particle size, in an associated manner with a map.

The wheel speed reliability degree determination unit 506 calculates the reliability of the wheel speed information based on information on a road surface that the road surface μ estimation unit 601 outputs, information of the vehicle 101, and information on conditions (for example, grip forces) of tires mounted on the vehicle 101, and outputs the calculation result to the estimation accuracy verification unit 118. In general, it is considered that a road surface μ of a paved dry road surface is approximately 0.8, a road surface μ of a paved wet road surface is a value that falls within a range of approximately 0.4 to 0.6, a road surface μ of a snowy road is a value that falls within a range of approximately 0.2 to 0.5, and a road surface μ of a frozen road falls within a range of approximately 0.1 to 0.2. A total friction coefficient μ' is estimated from a road surface μ and a situation of a tire, and a physical quantity at which the vehicle 101 starts sliding is calculated based on integration of the friction coefficient μ' and weight N of the vehicle 101.

The estimation accuracy verification unit 118 (FIG. 5) performs the verification of the estimation accuracy based on the reliability of vehicle speed information calculated by the wheel speed reliability degree determination unit 506, a pitch rate calculated by the first pitch rate calculation unit 116 and a pitch rate calculated by the second pitch rate calculation unit 117. When the reliability of vehicle speed information calculated by the wheel speed reliability degree determination unit 506 is high, the processing proceeds in the substantially same manner as the first embodiment. However, in a case where the reliability of vehicle speed information is low, the estimation of a vehicle state by the neural network is continued, or the processing to switch the wheel speed reliability degree determination unit 506 to alternative means is performed.

The above-mentioned road surface μ is an example, and in a case where states of tires cannot be acquired, the calculation of μ' can be simplified. Further, also with respect to the weight N of the vehicle 101, by also adding weight of an occupant and weight of a load to the weight N of the vehicle itself, the accuracy of the reliability can be enhanced.

Figure 7:
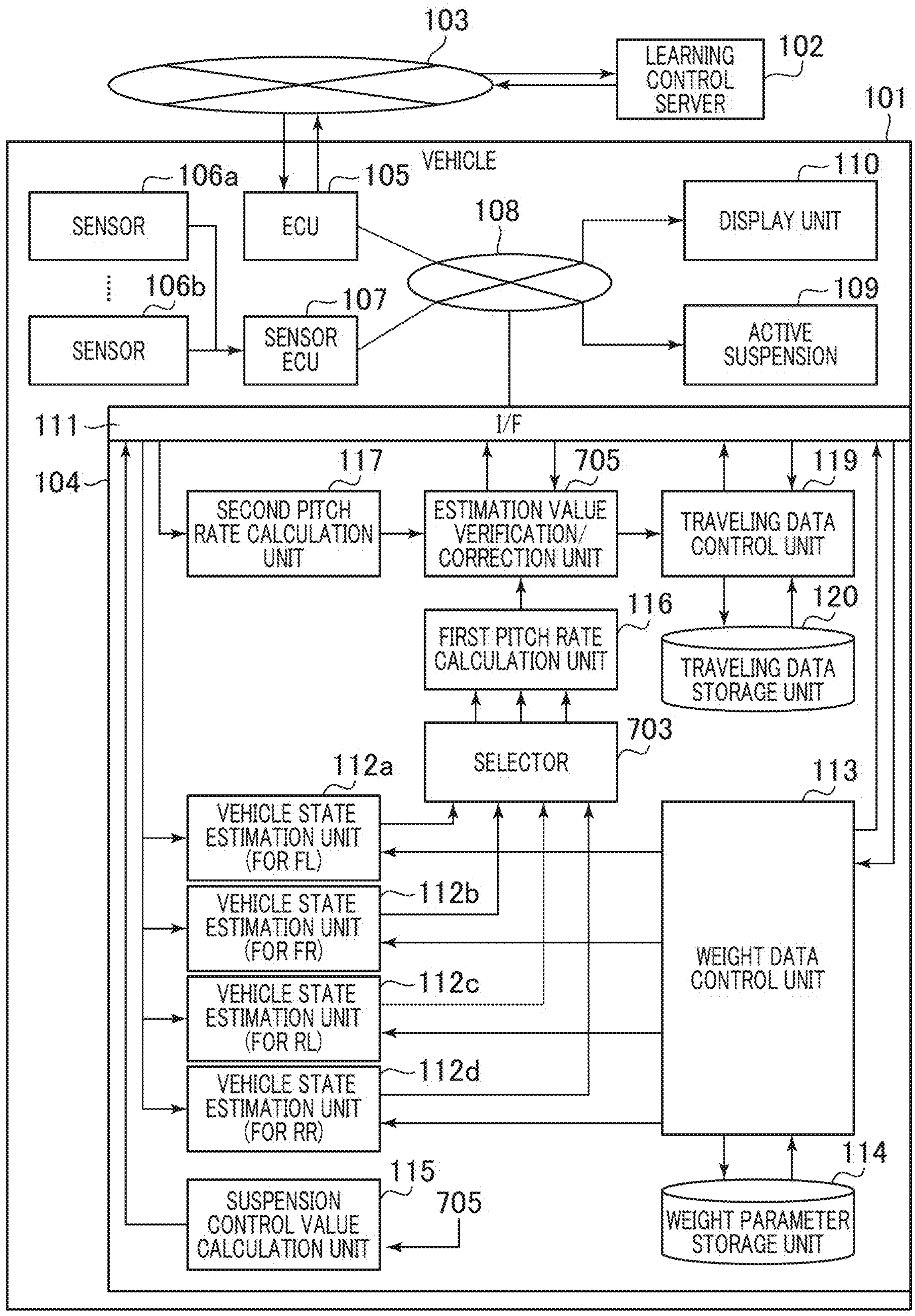
FIG. 7 is a functional block diagram of a suspension system according to a third embodiment of the present invention.

Third Embodiment (FIG. 7)

A suspension ECU 104 according to the present embodiment newly includes a selector 703 and an estimation value verification/correction unit 705 compared to the first embodiment. Further, the vehicle state estimation units 112*a* to 112*d* are disposed for respective four wheels and the respective vehicle state estimation units 112 a to 112*d* are associated with each other. As the vehicle state estimation units 112*a* to 112*d*, the FL (left front) vehicle state estimation unit 112*a*, the FR (right front) vehicle state estimation unit 112*b*, the RL (left rear) vehicle state estimation unit 112*c*, and the RR (right rear) vehicle state estimation unit 112*d* are disposed.

The selector 703 selects three estimation results from four vehicle state estimation units 112*a* to 112*d*, and the combinations are made different from each other. The first pitch rate calculation unit 116 calculates four kinds of pitch rates (first physical values) based on three estimation results selected by the selector 703. This is because, assuming that the vehicle 101 is a rigid body, the first physical values (pitch rates) can be calculated based on the estimation results (sprung vertical speeds) amounting to three wheels and hence, four kinds of first physical values can be calculated in accordance with the manner of selecting three estimation results.

The reason that the calculation is made in such a manner is as follows. In a case where, for example, the sprung vertical speed of only one wheel exhibits low accuracy in the comparison made in the estimation value verification/correction unit 705, there is a possibility that the pitch rates calculated based on sprung vertical speeds of other three wheels not including such one wheel substantially agree with the pitch rate derived from the wheel speed, and three kinds of pitch rates including such one wheel does not agree with the pitch rate derived from the vehicle speed. In this manner, the estimation value verification/correction unit 705 determines that the sprung vertical speed estimation values of three wheels that are used in the calculation of the pitch rates that agree with the pitch rates derived from the vehicle wheels exhibits high accuracy, and the estimation values of sprung vertical speed amounting to three corresponding wheels are transferred to the suspension control value calculation unit 115 and the remaining one wheel is excluded.

Further, the pitch rate can be calculated when there exist data amounting to three wheels as described above and hence, the estimation value verification/correction unit 705 inversely calculates the sprung vertical speed of one wheel determined to exhibit low accuracy using the correct pitch rate derived from the wheel speed and the sprung vertical speed amounting to three wheels. The estimation value verification/correction unit 705 transfers the sprung vertical speed of one wheel having low accuracy that is inversely calculated to the suspension control value calculation unit 115. That is, the estimation value verification/correction unit 705 that performs estimation accuracy verification performs the verification of four kinds of estimation results and the deriving of the estimation results by inverse calculation.

In this manner, when the pitch rate of a high accuracy is obtained even in one system, it can be determined that the estimation results of the sprung vertical speeds of three systems used in inducing such a pitch rate exhibit high accuracy, or it can be determined that the estimation result of the sprung vertical speed of the remaining one system exhibits low accuracy. In a case where the sprung vertical speed of low accuracy exists, by performing the inverse calculation using the pitch rates calculated by the second pitch rate calculation unit 117 and sprung vertical speed of three systems, the obtained value can be adopted as the estimation result and treated as teaching data of the neural network that realizes the vehicle state estimation unit 112 that performs in the learning control server 102.

Figure 9:
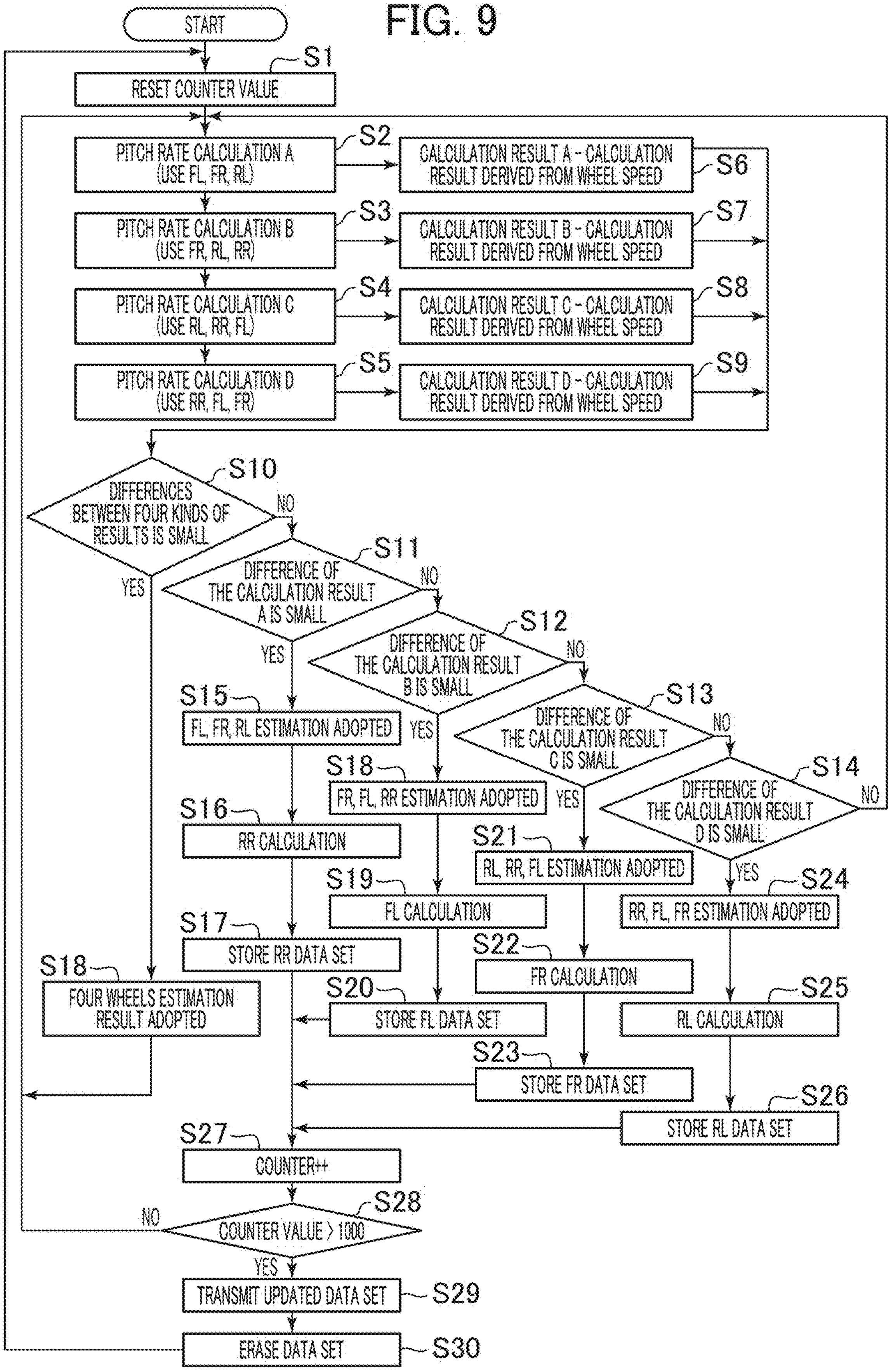
FIG. 9 is a flowchart used in the third embodiment.

In a case where all four differential values based on a comparison between fours kinds of first respective physical values and the second physical value are smaller than predetermined thresholds, four estimation results outputted from four vehicle state estimation unit 112*a* to 112*d* are adopted as the states of the suspensions 109, and the estimation results are transferred to the suspension control value calculation unit 115 (step S10, step S18 illustrated in FIG. 9 described later).

The estimation value verification/correction unit 705 transfers an input data set of any one of the vehicle state estimation units 112*a* to 112*d* that outputs the sprung vertical speed that exhibits low accuracy, and the sprung vertical speed that the estimation value verification/correction unit 705 calculates to the traveling data control unit 119, and the traveling data control unit 119 stores the input data set and the sprung vertical speed in the traveling data storage unit 120.

The traveling data control unit 119, when a fixed number (for example, 1000) of data sets are stored in the traveling data storage unit 120, transfers the data sets to the learning control server 102 via the interface 111 using the count as the transfer condition.

With such processing, the vehicle state estimation unit 112 can accumulate data sets that the vehicle state estimation unit 112 is unfamiliar to the learning control server 102 and hence, the accuracy of the vehicle state estimation units 112*a* to 112*d* can be enhanced by performing additional learning using the accumulated data.

(FIG. 8)

Figure 8:
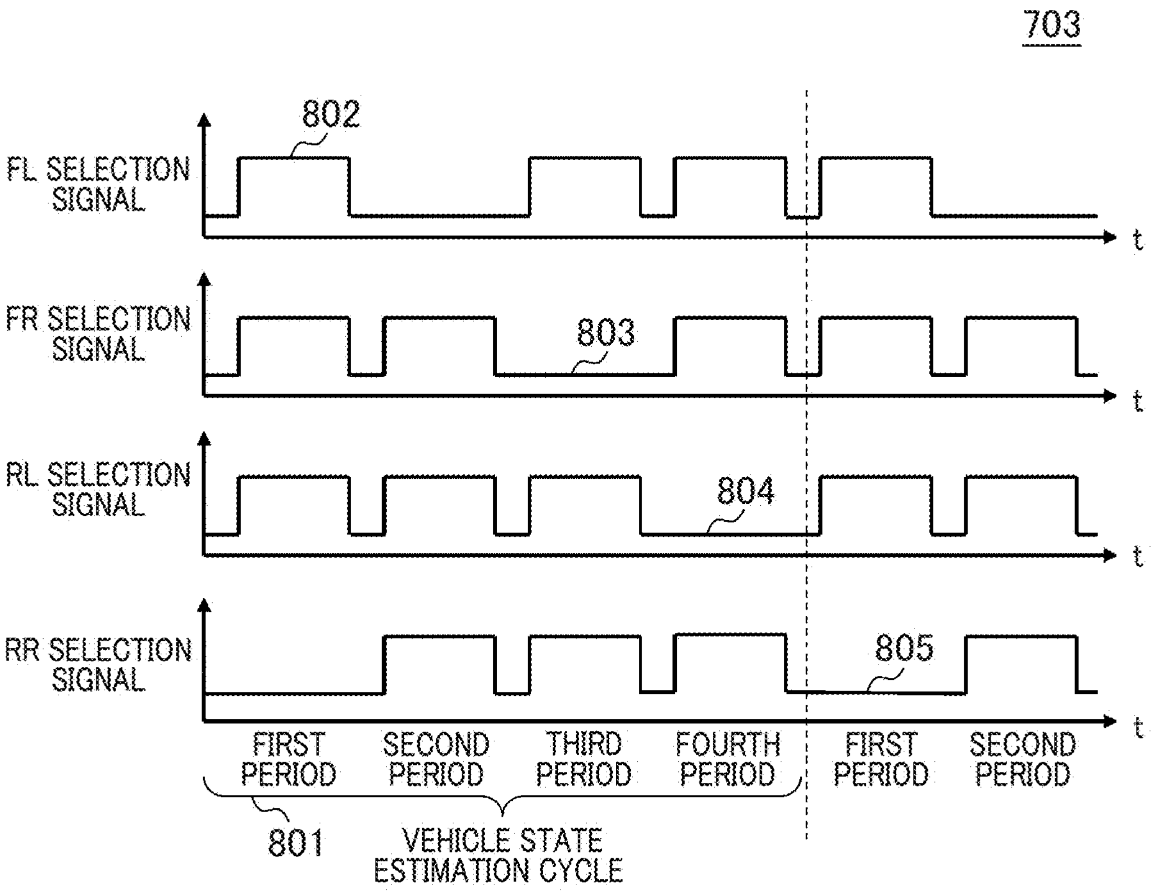
FIG. 8 is an example of control signals of selectors in the third embodiment.

The selector 703 is described. In FIG. 8, the selector 703 provides four phases using a vehicle state estimation cycle 801 that is an operation cycle of the vehicle state estimation unit 112 as the reference, and illustrates how three selection signals are selected out of an FL selection signal 802, an FR selection signal 803, an RL selection signal 804, and an RR selection signal 805. For example, assuming the cycle 801 20 m/sec, 20 m/sec is divided in four, and the combinations each selecting three wheels are made different from each other.

To look at the example in FIG. 8, in the first period, the FL selection signal 802, the FR selection signal 803 and the RL selection signal 804 are at a high level and hence, three kinds consisting of FL, FR and RL are selected. In the second period, the FR selection signal 803, the RL selection signal 804 and the RR selection signal 805 are at a high level and hence, three kinds consisting of FR, RL and RR are selected. In the third period, the FL selection signal 802, the RL selection signal 804 and the RR selection signal 805 are at a high level and hence, three kinds consisting of FL, RL and RR are selected. In the fourth period, the FL selection signal 802, the FR selection signal 803 and the RR selection signal 805 are at a high level and hence, three kinds consisting of FL, FR and RR are selected.

In FIG. 8, the estimation value verification/correction unit 705 is formed of one system, and these selection signals are control signals when serial processing is performed. When the estimation value verification/correction unit 705 is formed of four systems, the control signals are processed by parallel processing in general.

(FIG. 9)

A flowchart illustrating a third embodiment is described. In step S1, a value of a counter of a traveling data control unit 119 is set to 0 (reset). In step S2, the first pitch rate calculation unit 116 performs a pitch rate calculation A using a sensor estimation value calculated using sprung vertical speeds of the wheels FL, FR, RL. In step S3, the first pitch rate calculation unit 116 performs a pitch rate calculation B using a sensor estimation value calculated using sprung vertical speeds of the wheels FR, RL, RR. In step S3, the first pitch rate calculation unit 116 performs a pitch rate calculation C using a sensor estimation value calculated using sprung vertical speeds of the wheels RL, RR, FL. In step S4, the first pitch rate calculation unit 116 performs a pitch rate calculation D using a sensor estimation value calculated using sprung vertical speeds of the wheels RR, FL, FR.

In step S6, the estimation value verification/correction unit 705 calculates a value obtained by subtracting a calculation result derived from a vehicle speed calculated by the second pitch rate calculation unit 117 from the calculation result A calculated in step S2. In step S7, the estimation value verification/correction unit 705 calculates a value obtained by subtracting a calculation result derived from a vehicle speed calculated by the second pitch rate calculation unit 117 from the calculation result B calculated in step S3. In step S8, the estimation value verification/correction unit 705 calculates a value obtained by subtracting a calculation result derived from a vehicle speed calculated by the second pitch rate calculation unit 117 from the calculation result C calculated in step S3. In step S9, the estimation value verification/correction unit 705 calculates a value obtained by subtracting a calculation result derived from a vehicle speed calculated by the second pitch rate calculation unit 117 from the calculation result D calculated in step S5.

In step S10, the estimation value verification/correction unit 705 determines whether or not differences of four results calculated in step S6 to step S9 are smaller than a predetermined threshold. The differences of the calculated four results are smaller than the threshold, the processing proceeds to step S18, and the estimation value verification/correction unit 705 adopts four kinds of estimation results. Then, the processing returns to step S2 to continue the determination whether or not four kinds of estimation results can be succeedingly used (whether or not the differences being smaller than the thresholds).

In step S10, when the differences between the four kinds of calculated results are large, the processing proceeds to step S11. In step S11, the estimation value verification/correction unit 705 determines whether or not the difference of the calculation result calculated in step S6 is smaller than a predetermined threshold. When the difference is not smaller than the threshold, in step S12, the estimation value verification/correction unit 705 determines whether or not the difference of the calculation result calculated in step S7 is smaller than a predetermined value. When the difference is not smaller than a predetermined threshold, in step S13, the estimation value verification/correction unit 705 determines whether or not the difference of the calculation result calculated in step S8 is smaller than a predetermined threshold. When the difference is not smaller than a predetermined threshold, in step S14, the estimation value verification/correction unit 705 determines whether or not the difference of the calculation result D calculated in step S9 is smaller than a predetermined threshold. When the difference in step S14 is not smaller than the predetermined threshold, the processing returns to step S2.

In step S15, when the difference calculated in step S6 is smaller than a predetermined threshold in step S11, a sensor estimation value that is calculated using sprung vertical speeds of the wheels FL, FR, RL in the pitch rate calculation A in step S2 is adopted. In step S16, based on the above, the sprung vertical speed of the remaining wheel RR, and in S17, the calculated sprung vertical speed of the wheel RR is stored in the data set. With respect to steps S18 to S20 that form the calculation flow of the wheel FL, steps S21 to S23 that form the calculation flow of the wheel FR, steps S24 to S26 that form the calculation flow of the wheel RL, these flows are substantially equal to the flow from step S15 to step S17 and hence, the description of these steps is omitted.

In step S27, the traveling data storage unit 120 performs the counter processing. When the number of counter processing in step S27 exceeds 1000 in step S28, in step S29, the traveling data storage unit 120 transmits the updated data set to the learning control server 102. In step S30, the data set in the traveling data storage unit 120 is erased, and the processing returns to step S1 and repeats the above-mentioned flow. When the number of counter processing does not exceed 1000 in step S28, the processing returns to step S2 and repeats the above-mentioned flow.

Figure 10:
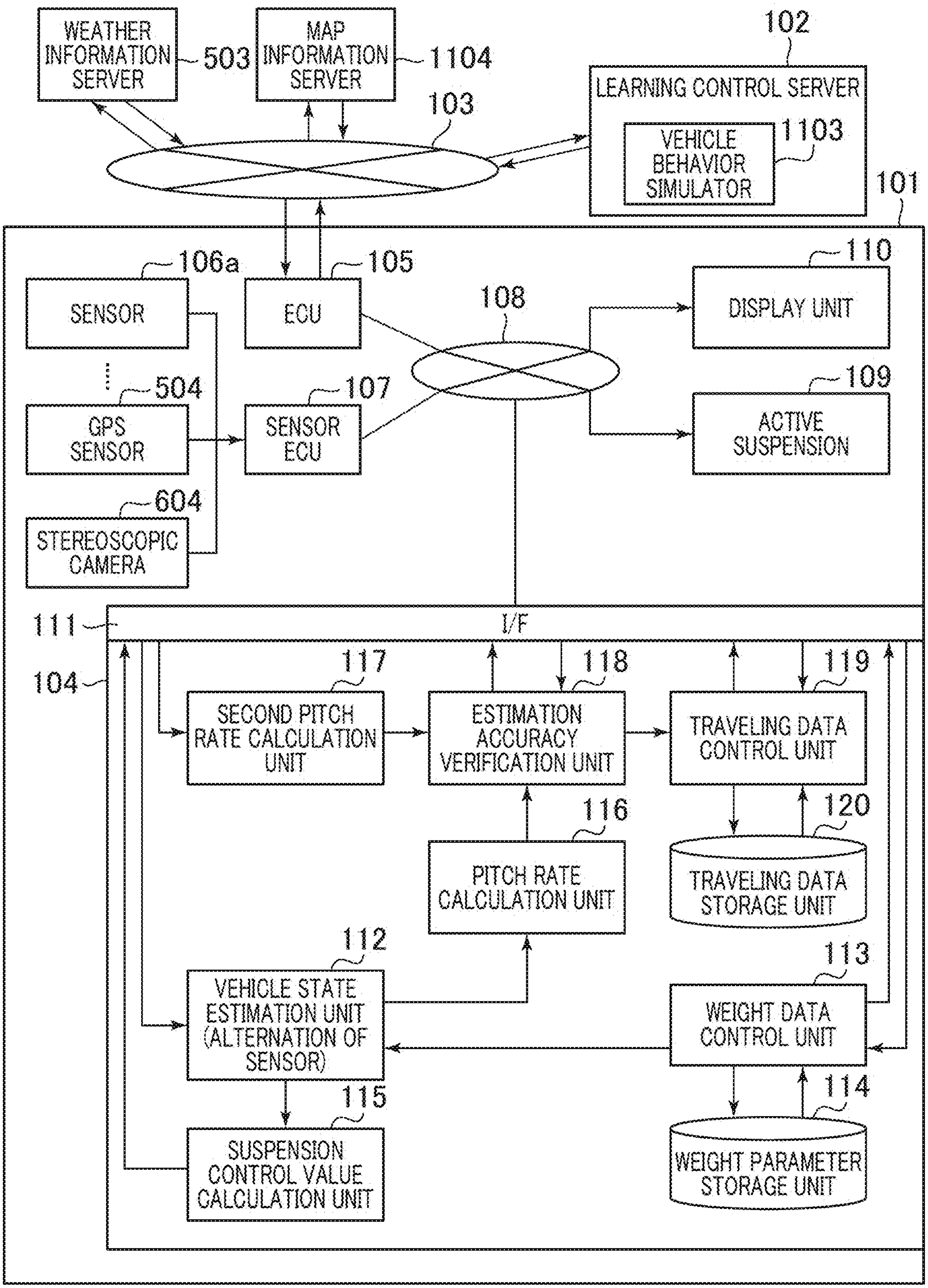
FIG. 10 is a functional block diagram of a suspension system according to a fourth embodiment.

Fourth Embodiment (FIG. 10)

A fourth embodiment has the configuration where relearning (updating of parameters) can be performed only by a virtual environment as long as a "familiar/unfamiliar" flag relating to traveling data exists. This means the following. In the above-mentioned embodiment, estimation accuracy of a sprung vertical speed and a piston speed that the vehicle state estimation unit 112 outputs is enhanced while the vehicle is traveling. On the other hand, in the fourth embodiment, the traveling environment is reproduced in a virtual environment, and the estimation accuracy of a sprung vertical speed and a piston speed is enhanced in a virtual environment.

To be more specific, the learning is performed in such a manner that the accuracy state is transferred to the learning control server 102 together with road information (including a road profile) acquired by the GPS sensor 504 and the stereoscopic camera 604 that are existing sensors, the accuracy state is reproduced by simulation in the learning control server 102, thus preparing the teaching data.

This embodiment is characterized in that, in the second embodiment, a vehicle behavior simulator 1103 is added to learning control server 102 and, the second embodiment includes, in its configuration, a map information server 1104 that is used for reproducing a real topography and a road shape in a virtual environment. The map information that the map information server 1104 treats is, for example, an open-source open street map (OSM), and may be other paid/free map data. These map data may include elevation/gradient information. In a case where the collection of data progresses, information such as a road profile may be applied.

Further, adding information of the weather information server 503 to the map information server 1104, the reproducibility of a real environment in a virtual environment is enhanced. Accordingly, the learning control server 102 learns weight parameters based on the second sensor information acquired by the second sensors (the weather information server 503, map information server 1104) mounted on the vehicle 101, and virtual environment information learned outside the vehicle 101. By utilizing the vehicle behavior simulator 1103 of the learning control server 102 in a sophisticated virtual environment, even when the measurement of an actual vehicle is not performed necessarily, it is possible to enhance the estimation accuracy of the measurement of a sprung vertical speed and a piston speed that the vehicle state estimation unit 112 outputs.

According to the embodiments of the present invention described heretofore, the following manner of operation and advantageous effects can be acquired.

(1) The suspension system performs calculations using machine learning by making sensor information acquired from the plurality of sensors 106 provided to the vehicle 101 and the state information of the suspension 109 provided to the vehicle 101 associate with each other. The suspension system includes: the weight parameter storage unit 114 that stores the weight parameters calculated by the machine learning; the vehicle state estimation unit 112 that outputs an estimation result of a state of the suspension 109 based on the sensor information and the weight parameters. The suspension system includes: the first vehicle behavior calculation unit 116 that calculates a first physical value of a physical quantity relating to behavior of the vehicle 101 based on the estimation result that is outputted; the second vehicle behavior calculation unit 117 that calculates a second physical value of the physical quantity based on the sensor information; and the estimation accuracy verification unit 118 that outputs estimation accuracy of the state of the suspension 109 by the vehicle state estimation unit 112 by comparing the first physical value and the second physical value to each other. The suspension system includes a traveling data control unit 119 that instructs learning of the weight parameters to the learning control server 102 based on an output result of the estimation accuracy by the estimation accuracy verification unit 118. With such a configuration, in the vehicle on which the suspension sensor is not mounted, the suspension system can extract an unfamiliar state of the neural network and can support the learning.

(2) The vehicle 101 includes four vehicle state estimation units 112 that are associated with four wheels that the vehicle 101 includes respectively, and includes the selector 703 that selects three estimation results out of four estimation results outputted from four vehicle state estimation units 112. With such a configuration, the state of the suspension 109 can be estimated by the vehicle state estimation unit 112 based on only the estimation results amounting to three wheels.

(3) The first vehicle behavior calculation unit 116 calculates four kinds of first physical values from three estimation results selected by the selector 703, and the estimation accuracy verification unit 118 adopts four estimation result outputted from four vehicle state estimation units 112 as the state of the suspension in a case where four differential values based on a comparison between four kinds of respective first physical values and the second physical value are smaller than a predetermined threshold, and adopts three estimation results selected by the selector 703 for calculating the first physical values as the state of the suspension 109 in a case where a differential value based on a comparison between any one kind of first physical values out of calculated four kinds of first physical values and the second physical value is smaller than a predetermined threshold, and the first vehicle behavior calculation unit 116 recalculates four kinds of first physical values from three estimation results selected by the selector 703 again in a case where a differential value based on a comparison between calculated four kinds of first physical values and the second physical value is larger than a predetermined threshold. With such a configuration, it is possible to perform the determination of the estimation accuracy that takes into account the estimation result of the vehicle state of low accuracy.

(4) The estimation accuracy verification unit 118 calculates the estimation result that is not selected by the selector 703 based on three estimation results selected by the selector 703 and the second physical value. With such a configuration, it is possible to calculate the first physical value also with respect to the estimation result that is not selected by the selector 703.

(5) The estimation accuracy that the estimation accuracy verification unit 118 outputs is provided to a user via the display unit 110. With such a configuration, the estimation accuracy of the state of the suspension 109 can be visualized.

(6) The first physical value and the second physical value are formed of a pitch rate or a roll rate of the vehicle 101. With such a configuration, the first physical value and the second physical value can be obtained based on a plurality of vehicle behavior data.

(7) The learning control server 102 learns weight parameters based on second sensor information acquired by the second sensor mounted on the vehicle 101 and virtual environment information learned outside the vehicle 101. With such a configuration, estimation accuracy of a sprung vertical speed and a piston speed can be enhanced in a virtual environment.

(8) The learning control server 102 learns weight parameters based on a computer mounted on the vehicle 101. With such a configuration, the weight parameters can be updated without installing the learning control server 102 on a vehicle 101 side.

The present invention is not limited to the above-mentioned embodiments, and various modifications and other configurations can be combined without departing from the gist of the present invention. Further, the present invention is not limited to the suspension system that includes all configurations described with reference to the above-mentioned embodiments, and includes suspension systems from each of which some elements of the configuration are deleted.

LIST OF REFERENCE SIGNS

101: vehicle
102: learning control server
103: network
104: suspension ECU
105: vehicle ECU
106: sensor
107: sensor ECU
108: CAN
109: active suspension
110: display unit
111: interface (I/F)
112: vehicle state estimation unit
113: weight data control unit
114: weight parameter storage unit (memory unit)
115: suspension control value calculation unit
116: first pitch rate calculation unit
117: second pitch rate calculation unit
118: estimation accuracy verification unit
119: traveling data control unit
120: traveling data storage unit
201: input layer element group of neural network
202: hidden layer element group of neural network
203: output layer element of neural network
204: time series data
205: sensor data
206: window
207: sensor data instantaneous value
401: measurement device screen
402: wheel speed data (CAN system data)
403: longitudinal acceleration data (CAN system data)
404: piston speed data (vehicle state estimation value)
405: pitch rate data (vehicle behavior physical value)
406: file output button
407: terminal screen
408: pitch rate derived from neural network
409: pitch rate derived from non-neural network
410: accuracy determination result
411: instrument panel
412: vehicle behavior estimation result
413: determination result display lamp
414: traveling distance meter
503: weather information server
504: GPS sensor
505: stereoscopic camera
506: wheel speed reliability determination unit
601: road surface μ estimation unit
703: selector
705: estimation verification/correction unit
801: vehicle state estimation cycle
802 to 805: selection signal
1103: vehicle behavior simulator
1104: map information server

The invention claimed is:

1. A suspension system that performs calculations using machine learning by making sensor information acquired from a plurality of sensors provided to a vehicle and suspension state information provided to the vehicle associate with each other, the suspension system comprising:

a weight parameter storage unit that stores a weight parameter calculated by the machine learning;

a vehicle state estimation unit that outputs an estimation result of a state of the suspension based on the sensor information and the weight parameter;

a first vehicle behavior calculation unit that calculates a first physical value of a physical quantity relating to behavior of the vehicle based on the estimation result that is outputted;

a second vehicle behavior calculation unit that calculates a second physical value of the physical quantity based on the sensor information;

an estimation accuracy verification unit that outputs estimation accuracy of the state of the suspension by the vehicle state estimation unit by comparing the first physical value and the second physical value to each other; and a traveling data control unit that instructs learning of the weight parameter to a learning control server based on an output result of the estimation accuracy by the estimation accuracy verification unit wherein the vehicle includes four vehicle state estimation units that are associated with four wheels that the vehicle includes respectively, and includes a selector that selects the three estimation results out of the four estimation results outputted from the four vehicle state estimation units, the first vehicle behavior calculation unit calculates four kinds of the first physical values from the three estimation results selected by the selector, the estimation accuracy verification unit adopts the four estimation results outputted from the four vehicle state estimation units as a state of the suspension in a case where four differential values based on a comparison between the four kinds of the respective first physical values and the second physical value are smaller than a predetermined threshold, and adopts the three estimation results selected by the selector for calculating the first physical values as the state of the suspension in a case where a differential value based on a comparison between any one kind of the first physical values out of calculated four kinds of the first physical values and the second physical value is smaller than a predetermined threshold, and the first vehicle behavior calculation unit recalculates four kinds of the first physical values from the three estimation results selected by the selector again in a case where a differential value based on a comparison between calculated four kinds of the first physical values and the second physical value is larger than a predetermined threshold.

2. The suspension system according to claim 1, wherein the estimation accuracy verification unit is configured to calculate the estimation result that is not selected by the selector based on the three estimation results selected by the selector and the second physical value.

3. The suspension system according to claim 1, wherein the estimation accuracy that the estimation accuracy verification unit outputs is provided to a user via a display unit.

4. The suspension system according to claim 1, wherein the first physical value and the second physical value are formed of a pitch rate or a roll rate of the vehicle.

5. The suspension system according to claim 1, wherein the learning control server is configured to learn the weight parameters based on second sensor information acquired by a second sensor mounted on the vehicle and virtual environment information learned outside the vehicle.

6. The suspension system according to claim 2, wherein the learning control server is configured to learn the weight parameters based on a computer mounted on the vehicle.

* * * * *